United States Patent

[11] 3,560,015

| [72] | Inventors | Lee J. Tracy;<br>Jesse L. Tracy; David S. Tracy, 629 8th St.,<br>Ogden, Utah 84404 |
|---|---|---|
| [21] | Appl. No. | 740,924 |
| [22] | Filed | June 28, 1968 |
| [45] | Patented | Feb. 2, 1971 |

[54] COMBINED WHEEL AND PACK CARRIER
3 Claims, 8 Drawing Figs.

[52] U.S. Cl............................................. 280/47.3, 224/9
[51] Int. Cl............................................. B62b 1/12
[50] Field of Search.................................. 280/47.3, 47.18, 47.24; 224/9

[56] References Cited
UNITED STATES PATENTS
2,401,986  6/1946  Talbott........................  224/9

| 3,236,537 | 2/1966 | Eckman...................... | 280/47.3X |
| 3,279,810 | 10/1966 | Ashworth.................... | 280/47.3 |

FOREIGN PATENTS

| 77,191 | 1/1949 | Czechoslovakia............ | 280/47.3 |
| 567,459 | 12/1923 | France....................... | 280/47.3 |

Primary Examiner—Leo Friaglia
Assistant Examiner—John A. Pekar
Attorney—B. Deon Criddle ABSTRACT: A device which can be used in a manner similar to a wheel barrow in moving a load and which is easily convertible by removing and reattaching the wheel to a pack carrier which can be readily and detachably secured to the back of an individual for pack carrying.

PATENTED FEB 2 1971　　　　　　　　　　　　3,560,015
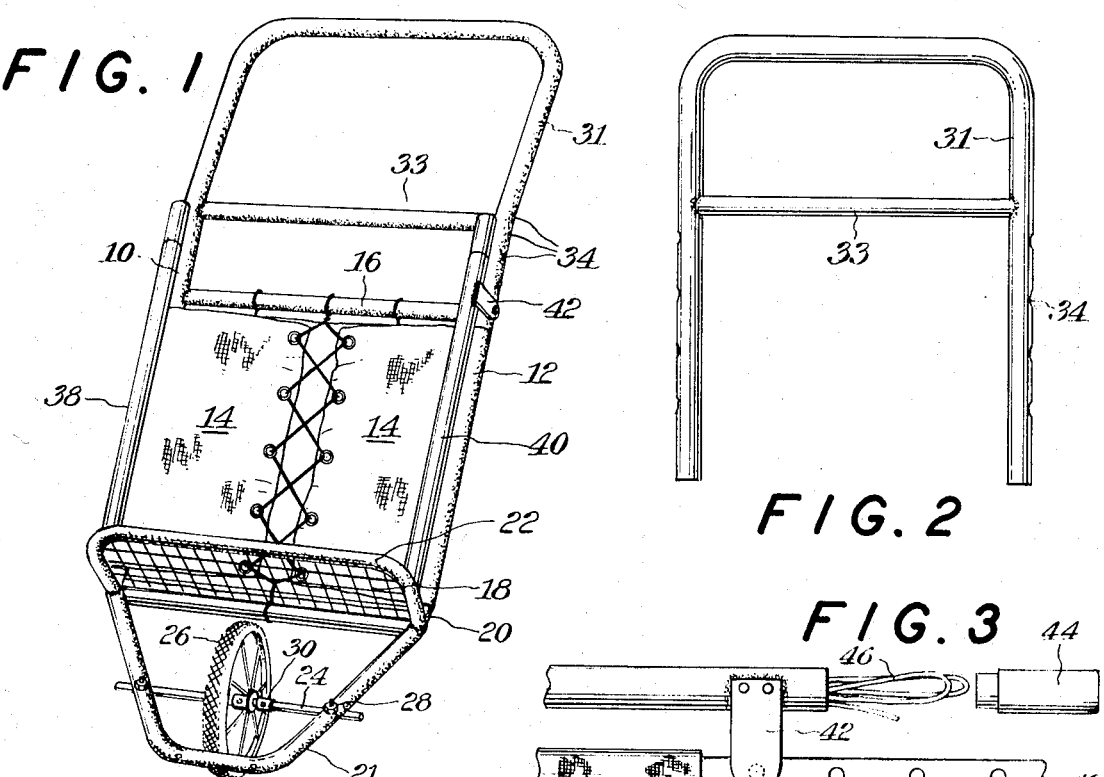
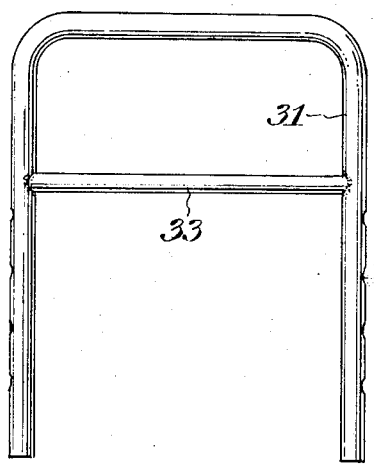
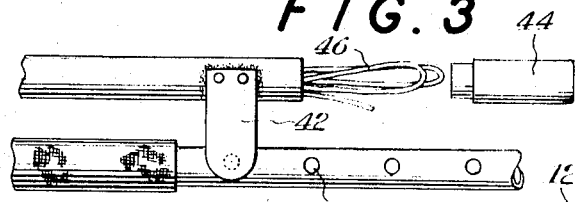
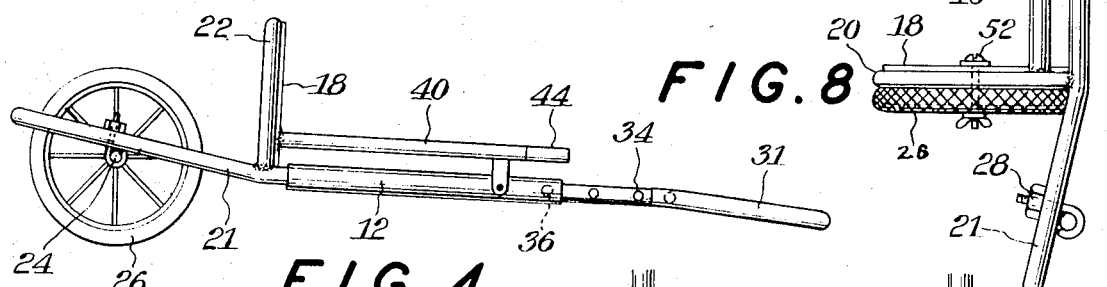
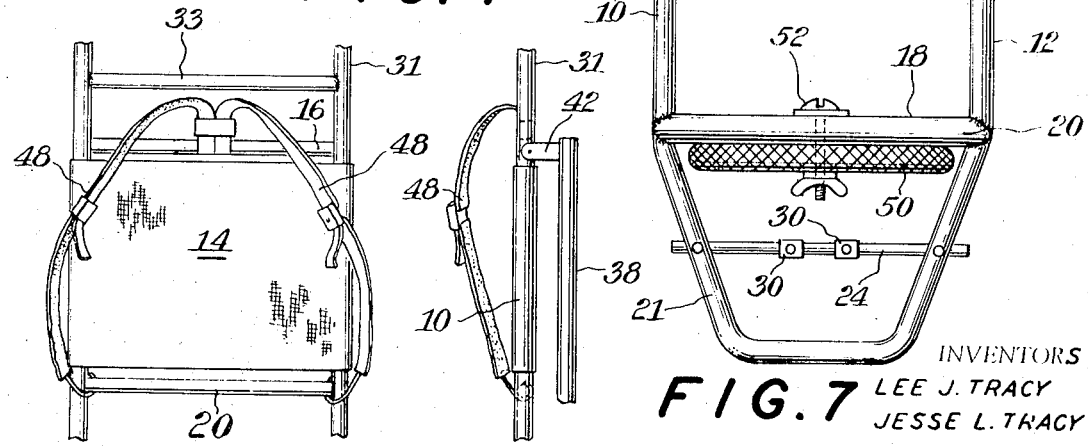
INVENTORS
LEE J. TRACY
JESSE L. TRACY
DAVID S. TRACY

COMBINED WHEEL AND PACK CARRIER

BRIEF DESCRIPTION OF THE INVENTION

There has long been a need for a device that can be used to wheel a load or to support a load on the back of a user. Hunters, for example, frequently desire to pack supplies into a camping and hunting area, but must wheel out game that has been killed, since it is too heavy to pack. Also, the economies are obvious if the same device that can be used as a pack frame can also be used as a wheel barrow in hauling various loads.

Objects of our invention are to provide a device that will serve the multiple use functions of a frame for back packing and a wheeled carrier.

Other objects are to provide such a device that can be easily converted from one use to the other and that will readily support loads when used in either manner.

SUMMARY OF THE INVENTION

Our device comprises a carrying frame backed with canvas or other suit. flexible material. The frame is adapted to detachably receive at one end a rotatable wheel. With the wheel, in position for use, one of the frame and canvas can support a load and the device can be used as a wheel barrow type unit. When the wheel is removed and the opposite side of the frame is strapped to the back of a user, our device becomes a pack carrier. The removed wheel can be readily secured to a load carrying frame of the pack carrier to be transported with the pack carrier.

BRIEF DESCRIPTION OF THE DRAWINGS

In the drawings:

FIG. 1 is a perspective view of a device of the invention with the wheel attached for use;

FIG. 2 is an elevation view of a top extension of our device;

FIG. 3 is an exploded fragmentary side elevation showing how rope or line can be removably stored in the frame of our device;

FIG. 4 is a side view of the device in FIG. 1;

FIG. 5 is a fragmentary rear view of a portion of our device, arranged for use as a pack carrier;

FIG. 6 is a side view of the portion of the device shown in FIG. 5;

FIG. 7 is a fragmentary front view of the bottom portion of the device arranged for use as a pack carrier; and FIG. 8 is a side view of the bottom portion shown in FIG. 7.

DETAILED DESCRIPTION

In the illustrated preferred embodiment, a rectangular frame, preferably, referring to the drawings formed of hollow tubing has a piece of canvas 14 or other suitable flexible sheet material with its ends laced together at the center of the frame. The canvas is wrapped about oppositely positioned, elongated tubes 10 and 12 which are spaced apart at opposite ends by two transversely extending tubes 16 and 20. The tubes 10, 12, 16 and 20 are secured thereto to form the frame that supports canvas 14. A tubular brace 22, supporting a heavy mesh material or plate 18 extends from tube 20 in a direction at right angles to tubes 10, 12, 14 and 16 to form a load supporting platform.

A bottom tubular extension 21 has a generally U-shape and is secured to tube 20 such that it extends downwardly away from both the frame and the platform. The extension 21 detachably supports an axle 24 about which wheel 26 is rotatable. Axle 24 is secured to the extension 21 by screws 28 and has sleeves 30 secured thereon to hold the wheel centered on the axle. The screws permit the axle to be attached or removed from the extension, and the sleeves, which may be secured to the axle by any conventional means such as set screws, permit the wheel to be attached or removed.

The upper ends of tubes 10 and 12 can telescopically receive corresponding legs of a U-shaped member 31 having a cross piece 33. These legs have holes 34 that will align a similar set of holes 36 in tubes 10 and 12 whereby the combined length of the frame and member 31 can be varied and set, as desired. A conventional spring lock (not shown) can extend through the aligned holes to hold parts 31, 10 and 12 together in extended or unextended position as needed for best efficiency. Other conventional lock devices can also be inserted through the aligned holes to secure the components together.

Hollow bars 38 and 40, each spaced from and extending parallel to a corresponding one of tubes 10 and 12, are each secured to their corresponding tube by a transverse metal strap 42. The bars are fixed at their bottom ends to brace 22 and are closed thereby. Removable end caps 44 in the other ends can be removed to expose stored folding ropes, thongs or lines 46 which can be easily removed and used. The hollow bars serve as side rails when the device is used for carrying objects, either as a pack frame or as a wheeled carrier.

When the device is used as a wheel barrow, as shown in FIGS. 1 and 2, member 31 serves as a handle, and goods can be tied or otherwise held on the front side of the canvas and with mesh plate 18 serving as a bottom support.

With the wheel removed, pack straps 48, which are adjustably connected between tube 16 and the junction of tube 20 and tubes 10 and 12 can be used to secure the rear surface of the frame and canvas to the back of a user. Wheel 26 can be removed from axle 24 and can then be detachably secured flat beneath to the mesh plate 18 by bolts 52. At this time the brace 22 and mesh plate 18 extend rearwardly from the back of the user to serve as a bottom horizontal support for the pack.

While we have described our invention with particular reference to the drawings, such is not to be considered as limiting its actual scope.

We claim:

1. A combined wheel and pack rack comprising:
   a frame having a top end and a bottom end with oppositely disposed parallel hollow tubes extending between the ends;
   load supporting means joined between said tubes and extending across said frame;
   a handle having legs adjustably and detachably extending into the tubes of said frame at the top end thereof;
   a wheel supporting extension secured to and extending away from the bottom end of said frame;
   a load supporting platform extending substantially normal to the frame and the extension at the bottom of the frame, said platform including a surrounding frame and in an intermediate mesh material;
   an axle detachably secured to the said extension;
   a wheel detachably secured to the center of said axle; and
   means carried by the load supporting platform for mounting the wheel flat beneath the mesh material, after the wheel is detached from the axle.

2. A combined wheel and pack rack carrier comprising:
   a frame having a top end and a bottom end and with oppositely disposed parallel hollow tubes extending between the ends;
   load supporting means joined between said tubes and extending across said frame;
   a handle having legs adjustably and detachably extending into the tubes of said frame at the top end thereof;
   a wheel supporting extension secured to and extending away from the bottom end of said frame;
   a load supporting platform extending substantially normal to the frame and the extension at the bottom of the frame;
   an axle detachably secured to the said extension;
   a wheel detachably secured to the center of said axle;
   means carried by the load supporting platform for mounting the wheel flat therebeneath after it is detached from the axle;

first and second elongate members, each being spaced from and parallel to a tube of the frame; and means holding said elongate members spaced from the said tubes and above the said load supporting platform.

3. A combined wheel and pack rack carrier as in claim 2, wherein the elongate members are hollow, and closed at one end; and removable cap means are provided for the open ends of the elongate members.